Figure 1:
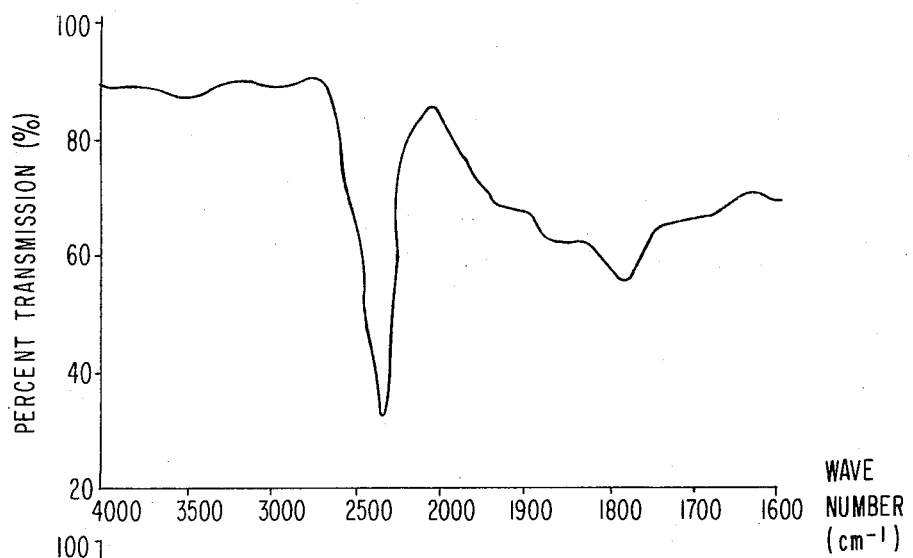

United States Patent
Kometani et al.

[15] 3,671,510
[45] June 20, 1972

[54] METHOD FOR POLYMERIZATION OF FLUORINE-CONTAINING HALOOLEFINS

[72] Inventors: Yutaka Kometani, Nishinomiya; Masayoshi Tatemoto; Masanori Nakamura, both of Osaka-fu, all of Japan

[73] Assignee: Daikin Kogyo Co., Ltd., Osaka-shi, Osaka-fu, Japan

[22] Filed: April 21, 1970

[21] Appl. No.: 30,572

[30] Foreign Application Priority Data

April 21, 1969 Japan..................................44/31128

[52] U.S. Cl. ........................................260/87.5 A, 260/87.7
[51] Int. Cl. .......................C08f 1/60, C08f 1/11, C08f 3/20
[58] Field of Search........................................260/87.5, 92.1

[56] References Cited

UNITED STATES PATENTS 2,700,662  1/1955  Young et al. ..........................260/92.8
2,775,618  12/1956  Dittman et al. ........................260/87.5
2,784,176  3/1957  Dittman et al. ........................260/92.1

*Primary Examiner*—Joseph L. Schofer
*Assistant Examiner*—John A. Donahue, Jr.
*Attorney*—Craig, Antonelli, Stewart & Hill

[57] ABSTRACT

A method for polymerization of fluorine-containing haloolefins which comprises subjecting one or more kinds of polymerizable fluorine-containing haloolefins to suspension polymerization in an aqueous medium in the presence of di(perchlorofluoroacyl) peroxide of the formula:

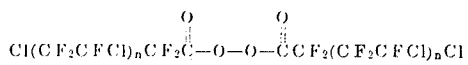

$$Cl(CF_2CFCl)_nCF_2C(O)-O-O-C(O)CF_2(CF_2CFCl)_nCl$$

wherein $n$ is an integer of 1 to 10. Compared with known organic peroxides, the polymerization initiator of the present invention is advantageous in affording polymers of high molecular weight in excellent yields.

6 Claims, 3 Drawing Figures

METHOD FOR POLYMERIZATION OF FLUORINE-CONTAINING HALOOLEFINS

The present invention relates to a method for polymerization of fluorine-containing haloolefins. More particularly, it relates to a method for suspension polymerization of fluorine-containing haloolefins in the presence of polymerization initiators.

For suspension polymerization of haloolefins, there have been known two types of polymerization initiators, i.e. inorganic polymerization initiators and organic polymerization initiators. Compared with inorganic polymerization initiators such as potassium persulfate, organic polymerization initiators such as organic peroxides are known to give generally polymers of better thermal stability. When, however, organic peroxides free of fluorine are used for polymerization of fluorine-containing haloolefins, a non-fluorinated radical is introduced as the terminal group so that the thermal stability of the produced polymers is made insufficient and unsatisfactory. Moreover, in many cases, such organic peroxides produce polymers only in low yields or require high temperatures and pressures. As the fluorine-containing organic peroxide useful as a polymerization initiator, there is known di(perfluoroacyl) peroxide of the formula:

$$B(CF_2)_m\overset{O}{\overset{\|}{C}}-O-O-\overset{O}{\overset{\|}{C}}(CF_2)_mB$$

wherein B is hydrogen or fluorine and m is an integer of 2 to 24 for polymerization of ethylenically unsaturated monomers in the absence of water [U.S. Pat. No. 2,559,630]. But, the initiator is hydrolyzed in the presence of water so that the initiation efficiency is extremely lowered and the conversion of the monomers into the polymers is much decreased.

As the results of the study seeking the polymerization initiators suitable for suspension polymerization of fluorine-containing haloolefins in an aqueous medium, it has been found that di(perchlorofluoroacyl) peroxide of the formula:

$$Cl(CF_2CFCl)_nCF_2\overset{O}{\overset{\|}{C}}-O-O-\overset{O}{\overset{\|}{C}}CF_2(CF_2CFCl)_nCl \quad [I]$$

wherein n is as defined above is quite excellent for such use. The presence of a relatively small amount of the polymerization initiator [I] in the reaction system for polymerization of fluorine-containing haloolefins produces the polymers of high molecular weight in excellent yields. Further, the initiation efficiency is so good that the polymers of desired average molecular weight are obtainable by appropriate selection of the concentration of the polymerization initiator, the temperature for polymerization and the time of polymerization. The present invention is based on the above finding.

In accordance with the present invention, there is provided a method for polymerization of fluorine-containing haloolefins which comprises subjecting one or more kinds of polymerizable fluorine-containing haloolefins to suspension polymerization in an aqueous medium in the presence of the polymerization initiator [I].

The polymerization initiator [I] may be produced, for instance, from a low polymer of chlorotrifluoroethylene according to the following scheme [U.S. Pat. No. 2,559,630]:

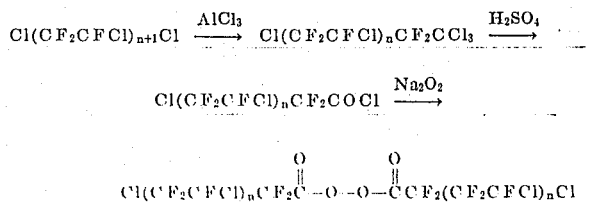

Examples of the polymerization initiator [I] are as follows:

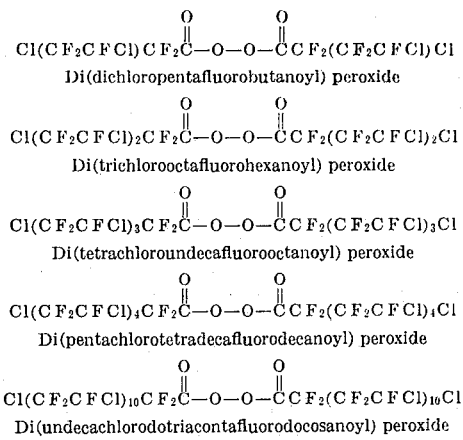

Of these, the ones wherein n is an integer of 1 to 3 are preferred. The polymerization initiator [I] wherein n is more than 4 is isolated with much difficulty from the reaction mixture and relatively small in solubility into various solvents but is comparatively resistant to hydrolysis.

As the fluorine-containing haloolefins, there may be exemplified tetrafluoroethylene, hexafluoropropylene, trifluoroethylene, chlorotrifluoroethylene, vinylidene fluoride, vinyl fluoride, etc. The fluorine-containing haloolefins may be subjected to polymerization of this invention alone or in combination with one or more other polymerizable monomers such as vinyl monomers, acrylic monomers and styrol monomers The operation for polymerization may be per se conventional.

Practical and presently-preferred embodiments of the present invention are illustratively shown in the following examples wherein parts and percent are by weight.

EXAMPLE 1

In an autoclave equipped with a stirrer, 150 parts of deoxygenated water are charged. After replacing the air by chlorotrifluoroethylene, 100 parts of chlorotrifluoroethylene are admitted thereto under pressure. A calculated amount of the polymerization initiator of the formula: $(RfCO)_2O_2$ in 20 to 50 percent trichlorotrifluoroethane solution is added to the autoclave. Then, polymerization is carried out.

The conditions for polymerization, the yield and flow value of the obtained polymer and the initiation efficiency are shown in Table 1. The flow value, which denotes an empirical index indicating the relative molecular weight of the polymer, is determined by the Koka flow tester (manufactured by Shimadzu Seisakusho Co., Ltd.) using a die of 1 mm in nozzle diameter and 1 mm in nozzle length and 2 g of the polymer at 230° C. under 100 kg load [cf. T. Arai: "A Guide To The Testing Of Rhedogical Properties With Koka Flow Tester" published by Maruzen Co., Ltd. on Feb. 25, 1958].

Hitherto, it is known that the polymerization of chlorotrifluoroethylene at a relatively high temperature affords the polymer of low molecular weight. Therefore, it is essential to effect the polymerization at a low temperature for production of the polymer of high molecular weight. In the suspension polymerization in an aqueous medium, however, the temperature around 5° C. is the lower limit which can be adopted. The decomposition rate of fluorinated diacyl peroxide in the presence of water is considerably large even around 5° C. and so high above 20° C. that the period of half decay is shorter than 16 hours (cf. Table 3 as hereinafter shown). When the time of polymerization is long, the concentration of

TABLE 1

| Number | Initiator, $R_f$ | Monomer (parts) | Amount of initiator (mol percent/monomer) | Polymerization conditions Temperature (°C.) | Reaction time (hours) | Conversion on monomer (percent) | Flow value ($10^{-3}$ ml./sec.) | Initiation efficiency |
|---|---|---|---|---|---|---|---|---|
| 1 | Cl(C$_2$F$_3$Cl)$_2$CF$_2$ | 100 | 0.019 | 5 | 61 | 34.6 | 0.12 | 0.67 |
| 2 | Cl(C$_2$F$_3$Cl)$_2$CF$_2$ | 100 | 0.045 | 5 | 65 | 53.0 | 0.43 | 0.67 |
| 3 | Cl(C$_2$F$_3$Cl)$_2$CF$_2$ | 100 | 0.045 | 10 | 63 | 61.9 | 0.74 | 0.52 |
| 4 | Cl(C$_2$F$_3$Cl)$_2$CF$_2$ | 100 | 0.020 | 15 | 63 | 42.3 | 0.35 | 0.42 |
| 5 | Cl(C$_2$F$_3$Cl)$_2$CF$_2$ | 100 | 0.020 | 25 | 19 | 20.5 | 10.8 | |
| 6 | Cl(C$_2$F$_3$Cl)CF$_2$ | 100 | 0.024 | 7.5 | 48 | 45.7 | 0.15 | |
| 7 | Cl(C$_2$F$_3$Cl)CF$_2$ | 100 | 0.024 | 25 | 18 | 18.0 | 23.0 | |
| 8 | H(C$_2$F$_4$) | 100 | 0.058 | 5 | 48 | 0 | | |
| 9 | H(C$_2$F$_4$) | 100 | 0.058 | 35 | 48 | 0 | | 0 |
| 10 | H(C$_2$F$_4$)$_2$ | 100 | 0.121 | 5 | 48 | 0.5 | 0.7 | 0.001 |
| 11 | H(C$_2$F$_4$)$_2$ | 100 | 0.121 | 15 | 48 | 2.3 | 2.5 | 0.0065 |
| 12 | H(C$_2$F$_4$)$_2$ | 100 | 0.121 | 35 | 48 | 13.3 | 300 | |
| 13 | H(C$_2$F$_4$)$_3$ | 100 | 0.027 | 5 | 48 | 6.9 | 0.5 | 0.061 |
| 14 | CF$_3$(C$_2$F$_4$) | 100 | 0.027 | 5 | 48 | 4.6 | 0.3 | 0.05 |
| 15 | CF$_3$(C$_2$F$_4$) | 100 | 0.027 | 35 | 48 | 5.1 | 98 | |

NOTE.—Nos. 1 to 7 are embodiments of the invention and Nos. 8 to 15 are controls.

the polymerization initiator in the reaction system is markedly changed. From Table 1 as hereinabove shown, it can be seen that di(perfluoroaceyl) peroxide and di(-hydroperfluoroacyl) peroxide are low in the initiation efficiency, while di(perchlorofluoroacyl) peroxide is high in the initiation efficiency and produces the polymer of high molecular weight.

EXAMPLE 2

In the same manner as in Example 1, various fluorine-containing haloolefins are subjected to polymerization using di(trichlorooctafluorohexanoyl) peroxide and a known polymerization initiator, i.e. diisopropyl peroxydicarbonate. The results are shown in Table 2.

The hexafluoropropylene content (C) of the polymer is calculated according to the following equation:

$$C(\%) = A/A' \times 3.2$$

wherein A and A' are respectively the absorbances at 980 cm$^{-1}$ and 2350 cm$^{-1}$ in the infrared absorption spectrum measured on the film of about 2 mils of thickness.

The specific melt viscosity indicates the apparent melt viscosity measured at 380° C. under a shearing stress of 0.457 kg/cm$^2$. That is, this value is determined using the Koka flow tester in the following manner: the polymer is charged in a cylinder of 9.5 mm in inner diameter, retained at 380° C. for 5 minutes and pushed out through an orifice of 2.1 mm in inner diameter and 8 mm in length under a piston load of 5 kg; the rate of pushing out (g/minute) is divided by 53,150 to give the value.

TABLE 2

| Number | Monomer | Initiator | Monomer (parts) | Amount of initiator (mol percent/monomer) | Polymerization conditions Temperature (°C.) | Reaction time (hrs.) | Yield (percent) | Intrinsic viscosity ($[\eta]$) | Solvent in measurement of intrinsic viscosity |
|---|---|---|---|---|---|---|---|---|---|
| 16 | Vinylidene fluoride | Diisopropyl peroxydicarbonate | 60 | 0.3 | 20 | 24 | 65 | 2.5 | 100 ml. dimethylacetamide/1 g. |
| 17 | Vinylidene fluoride | Di(trichlorooctafluorohexanoyl) peroxide | 60 | 0.35 | 20 | 35 | 92 | 10.4 | 100 ml. dimethylacetamide/1 g. |
| 18 | Vinylidene fluoride: tetrafluoroethylene | Diisopropyl peroxydicarbonate | 43-7 | 0.15 | 20 | 5 | 63 | 2.1 | 100 ml. dimethylacetamide/1 g. |
| 20 | Vinylidene fluoride: tetrafluoroethylene | Di(trichlorooctafluorohexanoyl) peroxide | 43-7 | 0.15 | 20 | 5 | 90 | 9.9 | 100 ml. dimethylacetamide/1 g. |
| 20 | Vinyl fluoride | Diisopropyl peroxydicarbonate | 60 | 0.085 | 35 | 6 | 58 | 2.8 | 100 ml. dimethylacetamide/1 g. |
| 21 | Vinyl fluoride | Di(trichlorooctafluorohexanoyl) peroxide | 50 | 0.35 | 20 | 6 | 87 | 5.5 | 100 ml. dimethylacetamide/1 g. |
| 22 | Chlorotrifluoroethylene: vinyl chloride | Diisopropyl peroxydicarbonate | 42-8 | 0.2 | 40 | 18 | 54 | 1.8 | 100 ml. cyclohexanone/1 g. |
| 23 | Chlorotrifluoroethylene: vinyl chloride | Di(trichlorooctafluorohexanoyl) peroxide | 42-8 | 0.2 | 20 | 18 | 78 | 6.7 | 100 ml. cyclohexanone/1 g. |

EXAMPLE 3

In an autoclave equipped with a stirrer, 1,500 parts of deionized and deoxygenated water and 1.5 parts of NaHCO$_3$ are charged. After replacing the air by nitrogen gas and then evacuating, 600 parts of hexafluoropropylene and 50 parts of tetrafluoroethylene are admitted thereto under pressure while maintaining the temperature at 25° C. Stirring is then started, and 2.5 parts of a 0.82 g/ml solution of di(1,2,4-trichloroperfluorohexanoyl) peroxide in trichlorotrifluoroethane are added thereto. Polymerization starts at once whereby the depression of pressure occurs. In order to maintain the pressure of the reaction system at about 10 kg/cm$^2$, tetrafluoroethylene is occasionally supplemented. The polyerization is carried out for 3.5 hours, and the monomer is removed. The produced polymer in powder is washed with water and dried at 70° C. for 48 hours. Yield, 110 parts. Hexafluoropropylene content, 13.2 percent. Specific melt viscosity, 8.5 × 10$^6$ poise.

EXAMPLE 4

In the same manner as in Example 3 but using 1.0 part of a 0.82 g/ml solution of di(1,2,4-trichloroperfluorohexanoyl) peroxide in trichlorotrifluoroethane, the polymerization is carried out for 4.5 hours to obtain 175 parts of the polymer. Hexafluoropropylene content, 10.0 percent. Specific melt viscosity, 1.97 × 10$^6$ poise.

REFERENCE EXAMPLE

In an autoclave equipped with a stirrer, 1,500 parts of deionized and deoxygenated water are charged, and the air is replaced by hexafluoropropylene. After admitting 300 parts of tetrafluoroethylene thereto under pressure, the temperature is raised up to 95° C. A solution of 0.15 part of ammonium persulfate in 20 parts of water is added, and stirring is carried out for 15 minutes. To the autoclave, 80 parts of tetrafluoroethylene are admitted, and a 5 percent aqueous solution of ammonium persulfate is continously introduced at a rate of 1.1 parts per minute. The polymerization starts at once and is effected for 80 hours, during which tetrafluoroethylene containing 8 percent of hexafluoropropylene is occasionally introduced to prevent the depression of pressure. Then, the monomer is released. The resultant white aqueous suspension is admixed with 800 parts of acetone and stirred vigorously. The separated polymer is collected by filtration, washed with water and dried to give 420 parts of white, powdery polymer. Hexafluoropropylene content, 13.3 percent. Specific melt viscosity, $4.9 \times 10^4$ poise.

Figure 2:
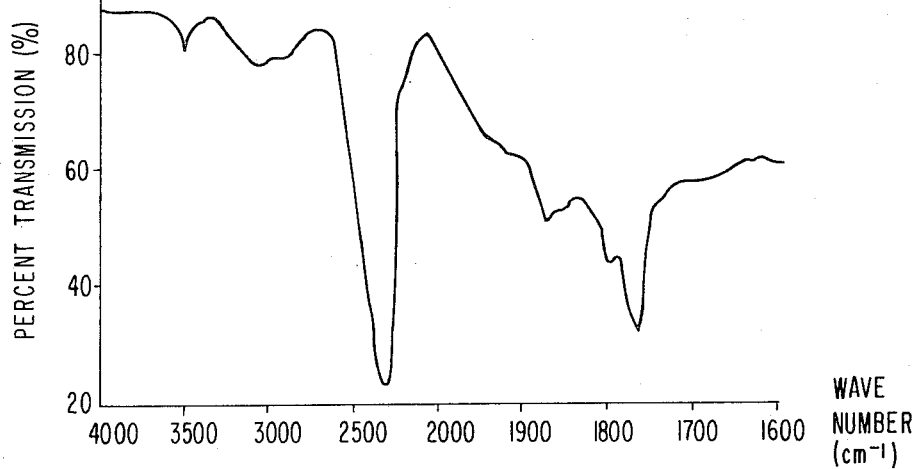

The infrared absorption spectra of the tetrafluoroethylene :hexafluoroprolyene copolymers obtained in Example 3 and Refernce Example are respectively shown in FIGS. 1 and 2 of the accompanying drawings, from which it is seen that the latter copolymer has the absorptions at 3,560, 3,080, 1,815 and 1,780 $cm^{-1}$ for the terminal carboxyl group, whereas the former copolymer has no such absorption.

When the said copolymers are burnt at 360° C. in nitrogen stream, the copolymer of Reference Example is colored blackish brown, while that of Example 3 is not colored at all.

Figure 3:
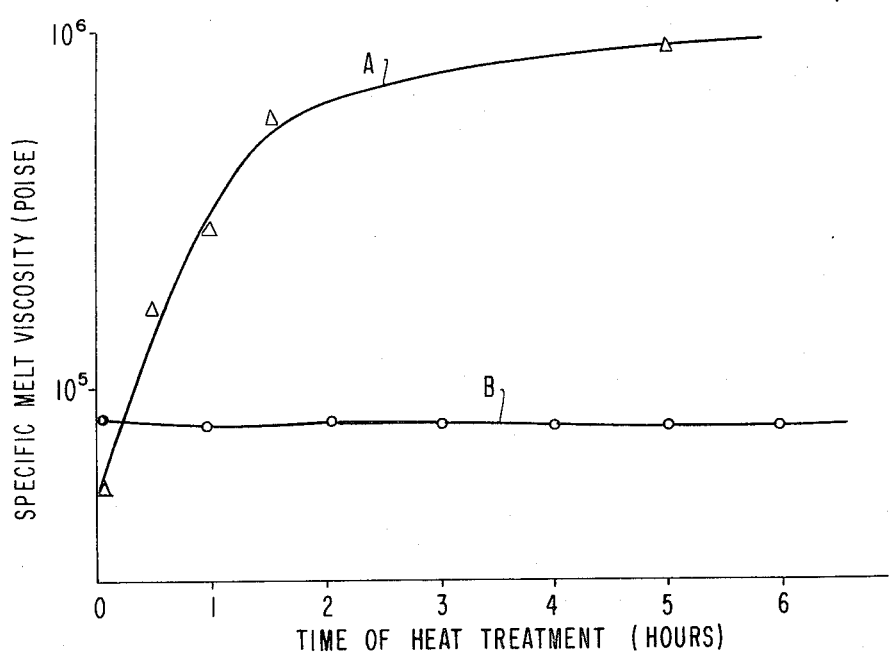

When the said copolymers are burnt at 340° C. in an air bath, the changes of the melt viscosities are as shown in FIG. 3 of the accompanying drawings, from which it is seen that the melt viscosity of the copolymer of Reference Example is markedly raised (Curve A) while that of the copolymer of Example 3 (Curve B) shows almost no change. Thus, the latter is extremely stable.

An acyl peroxide of the formula: $(RfCO)_2O_2$ is prepared by reacting an acid chloride with a slightly excess amount of sodium peroxide in an aqueous solution of sodium chloride at a temperature below 0° C. A 5 percent solution of the thus prepared acyl peroxide in trichlorotrifluoroethane is subjected to measurement of the decomposition rate and the activation energy at 5° and 23° C. The parameters after addition of a nearly equal amount of water to the amount of trichlorotrifluoroethane are also measured. The results are shown in Table 3.

TABLE 3

| | | Decomposition rate constant: Kd (min.$^{-1}$) | | | | Activation energy (Kcal./mol) | |
|---|---|---|---|---|---|---|---|
| | | 5° C. | | 23° C. | | | |
| Number | Initiator, Rf | Trichloro-trifluoro-ethane | Trichloro-trifluoro-ethane plus water | Trichloro-trifluoro-ethane | Trichloro-trifluoro-ethane plus water | Trichloro-trifluoro-ethane | Trichloro-trifluoro-ethane plus water |
| 24 | Cl(CF$_2$CFCl)CF$_2$ | 0.0070 | 0.0054 | 0.30 | 0.29 | 34 | 19 |
| 25 | Cl(CF$_2$CFCl)$_2$CF$_2$ | 0.0077 | 0.0077 | *1.38 | *1.38 | 29 | 29 |
| 26 | H(C$_2$F$_4$)$_2$ | 0.0086 | 0.044 | 0.15 | 0.23 | 26 | 15 |
| 27 | H(C$_2$F$_4$)$_3$ | 0.0079 | 0.031 | 0.15 | 0.20 | 27 | 17 |
| 28 | CF$_3$(C$_2$F$_4$) | 0.0042 | 0.043 | 0.10 | 0.14 | 29 | 8–10 |

*Measured at 35° C.

NOTE.—Nos. 24 and 25 are embodiments of the invention and Nos. 26 to 28 are controls.

What is claimed is:

1. In a method for polymerization of polymerizable fluorine-containing haloolefins by suspension polymerization in an aqueous medium, the improvement comprising carrying out said polymerization in the presence of di(perchlorofluoroacyl) peroxide of the formula:

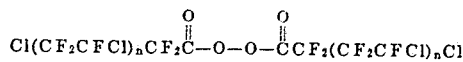

wherein n is an integer of 1 to 10.

2. The method according to claim 1, wherein the polymerizable fluorine-containing haloolefin is chlorotrifluoroethylene.

3. The method according to claim 1, wherein the polymerizable fluorine-containing haloolefin is vinylidene fluoride.

4. The method according to claim 1, wherein the polymerizable fluorine-containing haloolefins are tetrafluoroethylene and hexafluoropropylene.

5. The method according to claim 1, wherein n is 1.

6. The method according to claim 1, wherein n is 2.

* * * * *